(12) United States Patent
Yang

(10) Patent No.: US 8,520,380 B2
(45) Date of Patent: Aug. 27, 2013

(54) FRAME OF TOUCH PANEL

(75) Inventor: Kai-Ti Yang, Taoyuan (TW)

(73) Assignee: Luminous Optical Technology Co., Ltd., Taipei (TW)

( * ) Notice: Subject to any disclaimer, the term of this patent is extended or adjusted under 35 U.S.C. 154(b) by 435 days.

(21) Appl. No.: 12/973,910

(22) Filed: Dec. 21, 2010

(65) Prior Publication Data

US 2012/0154990 A1 Jun. 21, 2012

(51) Int. Cl.
*G06F 3/041* (2006.01)
*H05K 7/00* (2006.01)

(52) U.S. Cl.
USPC .............. 361/679.4; 361/679.01; 361/679.21; 345/173; 345/174; 178/18.06

(58) Field of Classification Search
USPC ............ 361/679.01, 679.21, 679.4; 345/173, 345/174; 178/18.06
See application file for complete search history.

(56) References Cited

U.S. PATENT DOCUMENTS

| | | | |
|---|---|---|---|
| 5,451,724 A * | 9/1995 | Nakazawa et al. | 178/18.05 |
| 5,844,175 A * | 12/1998 | Nakanishi et al. | 178/18.03 |
| 6,225,577 B1 * | 5/2001 | Sawai et al. | 178/18.01 |
| 6,304,251 B1 * | 10/2001 | Ito et al. | 345/173 |
| 6,356,259 B1 * | 3/2002 | Maeda et al. | 345/173 |
| 6,556,189 B1 * | 4/2003 | Takahata et al. | 345/173 |
| 6,573,155 B2 * | 6/2003 | Ahn et al. | 438/455 |
| 6,587,097 B1 * | 7/2003 | Aufderheide et al. | 345/173 |
| 6,909,425 B2 * | 6/2005 | Matsuda et al. | 345/173 |
| 6,965,375 B1 * | 11/2005 | Gettemy et al. | 345/173 |
| 6,975,305 B2 * | 12/2005 | Yamashita | 345/173 |
| 7,184,027 B2 * | 2/2007 | Sato et al. | 345/173 |
| 7,215,331 B2 * | 5/2007 | Song et al. | 345/173 |
| 7,348,964 B1 * | 3/2008 | Gettemy et al. | 345/173 |
| 7,483,016 B1 * | 1/2009 | Gettemy et al. | 345/173 |
| 7,499,038 B2 * | 3/2009 | Nishikawa et al. | 345/174 |
| 7,609,252 B2 * | 10/2009 | Horikawa et al. | 345/173 |
| 8,049,127 B2 * | 11/2011 | Yamaue et al. | 200/512 |
| 8,217,911 B2 * | 7/2012 | Gettemy et al. | 345/173 |
| 2009/0046077 A1 * | 2/2009 | Tanaka et al. | 345/174 |
| 2009/0096759 A1 * | 4/2009 | Nishiwaki et al. | 345/173 |
| 2010/0283762 A1 * | 11/2010 | Takusa | 345/174 |
| 2011/0205183 A1 * | 8/2011 | Sugihara | 345/174 |
| 2011/0267298 A1 * | 11/2011 | Erhart et al. | 345/173 |
| 2012/0154990 A1 * | 6/2012 | Yang | 361/679.01 |

* cited by examiner

*Primary Examiner* — Ramon Barrera
(74) *Attorney, Agent, or Firm* — Raymond Y. Chan; David and Raymond Patent Firm

(57) ABSTRACT

An ornamental frame of touch panel includes a first color frame layer provided at an outer periphery portion of a bottom surface of the upper panel of the touch panel, and a second color frame layer provided at an inner periphery portion of the first color frame layer and extended from the surface of the first color frame layer to overlap with the bottom surface of the upper panel, wherein the ornamental frame can just cover the signal leads extended along the edges of the touch sensor. The first color frame layer and the second color frame layer are non-transparent or nearly non-transparent film layers, wherein the first color frame layer is thicker than the second color frame layer.

20 Claims, 2 Drawing Sheets

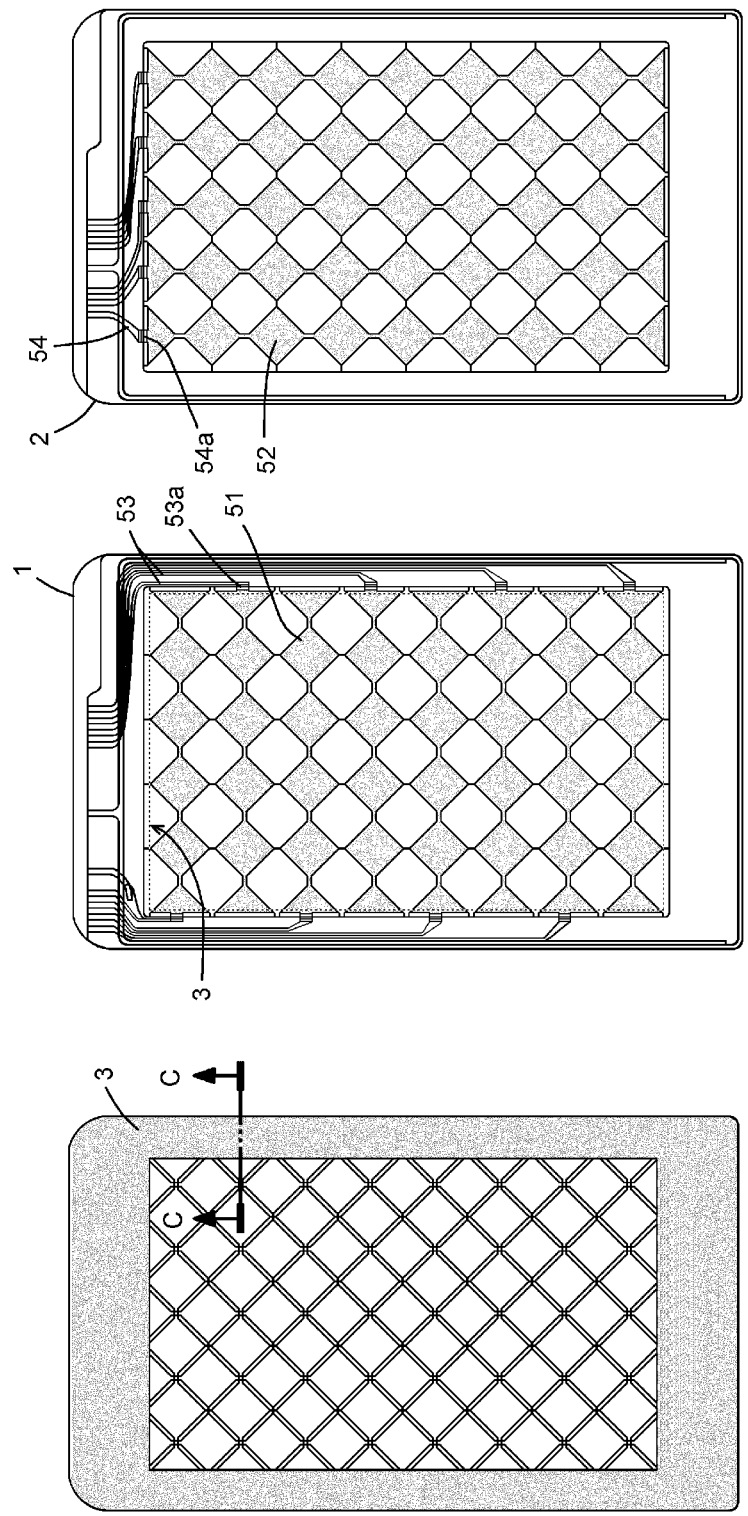

FRAME OF TOUCH PANEL

BACKGROUND OF THE PRESENT INVENTION

1. Field of Invention

The present invention relates to an ornamental frame of touch panel, and more particularly to an improved ornamental frame of a touch panel comprising a frame-shape ornamental layer disposed at the bottom surface of the touch panel for ornamenting and protecting the signal leads provided at the periphery edge of the touch panel.

2. Description of Related Arts

Recently, the touch panel is widely used in the mobile phones, the cameras, the satellitic navigators, and the other general consumer electric products, in order to improve the use interface and advance the input efficiency. Generally, the touch panel is transparent and arranged in front of the displays of these electric products, so as to enable the users to execute interacting inputs according to the instruction messages on the display, thereby the communication between human and the machine could be more user friendly and greatly improved. The typical touch panel comprises a capacitance type touch sensor insulatedly disposed between a top panel and a base panel, and signal leads disposed on the periphery edge of the stacked layers to transmit signals of the touch sensor to a signal processing circuit, and an ornamental frame disposed at the periphery edge of the touch panel, wherein the ornamental frame completely covers the signal leads on the periphery edge to protect the signal leads for ornamenting the panel. Conventionally, the ornamental frame is printed on the outside surface of the touch panel to form a thin color frame layer thereon.

Recently there is a trend to design the electric products in planar panel configuration, so the thin color frame layer is alternatively printed on the bottom surface of the upper panel to ensure that the touch panel having a smooth and flat surface after assembly. However, the printed thin color frame layer normally has a thickness of more than 15 μm, and even up to 200 μm. Hence, when the printed thin color frame layer is adhered between the upper panel and the lower panel, the adhesive glue always leaks near the edges of the thin color frame layer or has residual air bubbles therein, resulting that the optical character and the ornament are greatly damaged.

Besides, when the thin color frame layer is printed onto the bottom surface of the top panel, the upper ITO resistance film disposed on the upper portion of the bottom surface of the top panel must extend over the color frame layer to connect with the signal leads. However, the ITO resistance film only has a thickness of about 20 nm and is made of a material with poor flexibility, so that and the clearance difference between the thickness of the color frame layer and the bottom surface of the top panel will easily cause damages or fractures to the ITO resistance film when the ITO resistance film extending over the inner peripheral edge portion of the color frame layer, resulting in poor transmission signals. In order to avoid the aforesaid defectives, people skilled in the art replace the conventional printing means with a photo-resistance coating method to produce the ornamental frame, in which the photo-resistance film layer formed generally has a thickness of less than 1 μm, so that when it is arranged with the ITO resistance film, the ITO resistance film would not cause damages or fractures at the portions extending over the photo-resistance film layer. However, there are still a lot of shortcomings when the photo-resistance film layer is used in the ornamental frame. For example, as the light resistance film layer is very thin, it is very easy to be scraped that causes damages and translucent phenomenon during the manufacturing process of the touch panel. In addition, the current manufacturers produce aforesaid photo-resistance film by means of a wet-coating method, such as spin coating or slot coating, both of which use liquid form light resistance reagent to coat on the surface of the panel. However, when such light resistance reagent is coated onto the edges of the panel or the portions with grooves or holes thereon (such as holes for microphone or functional key), the light resistance liquid will always flow along the vertical faces of the edges and cause pollution, which is very hard to be cleaned up. As mentioned above, the conventional ornamental frame of the touch panel has a lot of shortcomings that needs to be improved and overcome.

SUMMARY OF THE PRESENT INVENTION

The invention is advantageous in that it provides an improved ornamental frame of touch panel, wherein the ornamental frame is disposed in the overlapped layers of the touch panel and comprises two film layers of color frame with different thicknesses, so that by means of the thicker printed color frame layer disposed at the outer peripheral edge of the panel or the portion with grooves and/or holes, the coating of the respective color frame layer can be accurately positioned, and that by means of the thinner photo-resistance color frame layer overlappedly extended between the inner periphery of the aforesaid printed color frame layer and the surface of the panel, it facilitates the overlapping arrangement of the ornamental frame and the ITO resistance film and thus avoiding the overlapping portion of the ITO resistance film from damages and fractures.

Additional advantages and features of the invention will become apparent from the description which follows, and may be realized by means of the instrumentalities and combinations particular point out in the appended claims.

According to the present invention, the foregoing and other objects and advantages are attained by an ornamental frame of touch panel, wherein the touch panel comprises an upper panel, a lower panel, and a touch sensor insulatedly disposed therebetween. Signal leads of the touch sensor are extended along edges thereof for transmitting detected signals of the touch sensor to a signal processing circuit, wherein the upper panel, the lower panel and the touch sensor are made of substantially transparent thin sheets, wherein the touch sensor is made of transparent electrical conducting film with good electricity conductivity, including but not limited to indium tin oxide (ITO), indium zinc oxide, zinc aluminum oxide, PEDOT, and etc.

The ornamental frame comprises a first color frame layer provided at an outer periphery portion of a bottom surface of the upper panel and a second color frame layer provided at the portion adjacent to an inner periphery portion of the first color frame and extended overlappedly from the first color frame layer to the bottom surface of the upper panel, wherein the first color frame layer and the second color frame layer are composed to form the ornamental frame and adapted for covering signal leads disposed edges of the touch sensor.

In a preferred embodiment of the present invention, the first color frame layer and the second color frame layer are non-transparent or nearly non-transparent film layers.

In a preferred embodiment of the present invention, the first color frame layer is a printed color frame layer having a film layer thickness of more than 10 μm.

In a preferred embodiment of the present invention, the second color frame layer is a photo-resistance color frame layer having a film layer thickness of less than 2 m.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 1 is a plan view of the ornamental frame according to a preferred embodiment of the present invention.

FIG. 2 is a plan view of the bottom surface of the upper panel of the ornamental frame according to the above preferred embodiment of the present invention.

FIG. 3 is a plan view of the top surface of the lower panel of the ornamental frame according to the above preferred embodiment.

DETAILED DESCRIPTION OF THE PREFERRED EMBODIMENT

Figure 4:
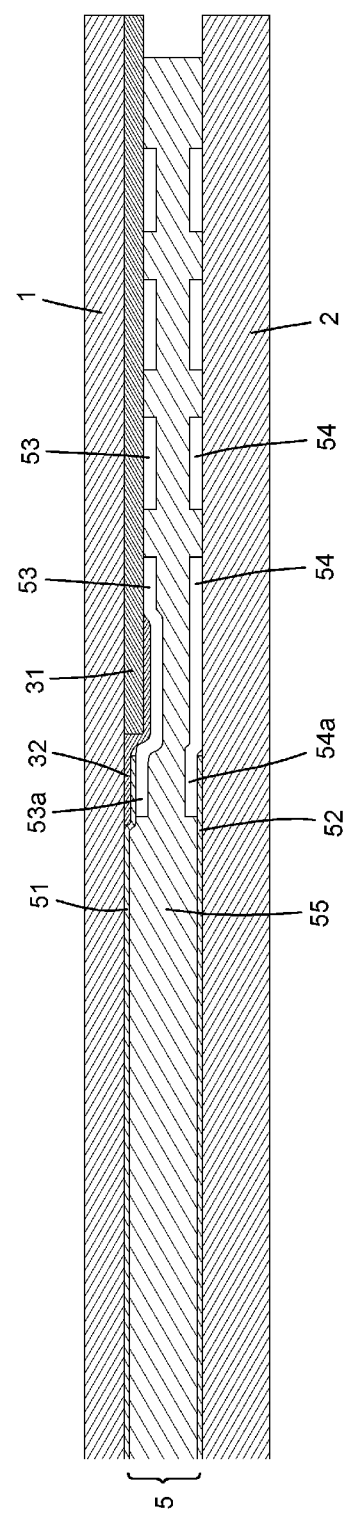
FIG. 4 is a C-C sectional view of FIG. 1.

Referring to FIGS. 1-4, a capacitance type touch panel according to a preferred embodiment of the present invention is illustrated, wherein the capacitance type touch panel comprises a capacitance type touch sensor 5 insulated disposed between an upper panel 1 and a lower panel 2 and is capable of generating a capacitance effect at the moment of the surface of the touch panel being touched with a finger or a conductor by a user, wherein the position of the finger or the conductor can be determined according to the changing of the capacity value for inputting signals.

The capacitance type touch sensor 5 comprises a pair of upper capacitance sensor layer 51 and lower capacitance sensor layer 52, wherein a plurality of X-Traces is provided on the upper capacitance sensor layer 51 and a plurality of Y-Traces is provided on the lower capacitance sensor layer 52. A plurality of first signal leads 53 is provided at a peripheral edge of the upper capacitance sensor layer 51 wherein an end portion of each X-Trace is electrically connected to the respective first signal lead 53. A plurality of second signal leads 54 is provided at a peripheral edge of the lower capacitance sensor layer 52, wherein an end portion of each Y-Trace is electrically connected to the respective second signal lead 54. Accordingly, capacitance sensing signals can be transmitted to the signal processing circuit via the first and second signal leads 53, 54. Generally, the upper and the lower capacitance sensor layers are transparent films made of Indium Tin Oxide and etched to eliminate the undesired portions to form the X-Traces and the Y-Trances thereon respectively.

The upper panel 1 and the lower panel 2 are flat sheets or unflat sheets made of a material having high translucent rate, which could be glass sheet or other flexible thin sheet such as PC, PET, PMMA, COC, and etc. However, such material is not limited to the abovementioned material and could be any other soft or hard thin sheet material. Referring to FIG. 4, a first color frame 31, embodied as a printed color frame layer, is provided near an outer periphery portion of a bottom surface of the upper panel 1, which is printed with black printing ink made of organic or inorganic material having a coating thickness more than 10 μm. Also, a second color frame 32, embodied as a photo-resistance color frame layer, is provided near an inner periphery portion of the printed color frame layer 31 and extended from the surface of the printed color frame layer 31 to overlap with the bottom surface of the upper panel 1, wherein the photo-resistance color frame layer 32 utilizes black negative photoresist, such as polyisoprene, to form a coating thickness of less than 2 μm. The printed color frame layer 31 and the photo-resistance color frame layer 32 are composed to form an ornamental frame 3 of the touch panel adapted for fittingly covering the signal leads 53, 54 disposed along the edges of the touch sensor 5.

In addition, the upper capacitance sensor layer 51 of the capacitance type touch sensor 5 is provided on a working portion area of the bottom surface of the upper panel 1 with its peripheral edge overlapped on the photo-resistance color frame layer 32, wherein connection points 53a of the first signal leads 53 are overlapped with the printed color frame layer 31 and the photo-resistance color frame layer 32 and then connected with the peripheral edge of the upper capacitance sensor layer 51. Also, the lower capacitance sensor layer 52 of the capacitance type touch sensor 5 is provided on a working portion area of the top surface of the lower panel 2, and connection points 54a of the second signal leads 54 are connected with the peripheral edge of the lower capacitance sensor layer 52.

The upper panel 1 and the upper capacitance sensor layer 51 thereon are overlapped with the lower panel 2 and the lower capacitance sensor layer 52 thereon with an insulating layer 55 therebetween, wherein the upper panel 1, the upper capacitance sensor layer 51, the insulating layer 55, the lower capacitance sensor layer 52, and the lower panel 2 are overlappedly stacked and integrated to form an integral panel body. The insulating layer 55 is a transparent insulating adhesive layer made of the material selected from, but not limited to, the group of UV adhesive, Optically Clear Adhesive (OCA), Isoprene Rubber (IR) adhesive, and etc. . . .

The ornamental frame 3 of the touch panel constructed as disclosed above can just completely cover the signal leads 53, 54 disposed along the edges of the touch sensor 5, wherein the ornamental frame 3 is formed within the overlappedly stacked layers of the touch panel, so as to ensure a beautiful and smooth appearance of the touch panel. According to the present invention, the first color frame layer 31 is a film printed onto the portions near the outer periphery portion and the portions with holes or grooves of the lower panel 2, in order to overcome the leaking defects of the conventional photo-resistance coating method in which the photo-resistance liquid always leaks while applying it onto these portions. Furthermore, the printing position of the color frame layer 31 could be easily controlled according to the present invention. For example, by means of screen printing, the positions of the grooves and holes could be predetermined and accurately printed in the printing area, and that since the printed color frame layer 31 has a thicker film thickness, the touch panel is not easy to be damaged by scraping during the manufacturing process that substantially increases the production efficiency. In addition, in the present invention, the inner peripheral edge of the printed color frame layer 31 is coated with a thinner photo-resistance film color frame layer by means of the photo-resistance coating method, which can prevent the overlapping portions of the electrical conductive films from being damaged and fractured.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An ornamental frame of touch panel comprising an upper panel, a lower panel and a touch sensor insulated disposed therebetween, wherein said touch sensor has signal leads extended along edges thereof for transmitting detected signals of said touch sensor to a signal processing circuit, wherein said ornamental frame comprises:
a first color frame layer provided at an outer periphery portion of a bottom surface of said upper panel; and
a second color frame layer provided at an inner periphery portion of said first color frame, wherein said second color frame layer is extended from a surface of said first color frame layer to overlap with said bottom surface of said upper panel, wherein said first and second color frame layers compose said ornamental frame to fittingly cover said signal leads disposed on said edges of said touch sensor.

2. The ornamental frame, as recited in claim 1, wherein said first color frame layer and said second color frame layer are non-transparent film layers.

3. The ornamental frame, as recited in claim 1, wherein said first color frame layer and said second color frame layer are nearly non-transparent film layers.

4. The ornamental frame, as recited in claim 1, wherein said first color frame layer is a printed color frame layer having a film layer thickness of more than 10 μm.

5. The ornamental frame, as recited in claim 1, wherein said second color frame layer is a photo-resistance color frame layer having a film layer thickness of less than 2 μm.

6. A touch panel, comprising:
an upper panel;
a lower panel;
a touch sensor, which is insulatedly disposed between said upper panel and said lower panel, having signal leads extended along edges of said touch sensor for transmitting detected signals of said touch sensor to a signal processing circuit; and
an ornamental frame, comprising
a first color frame layer provided at an outer periphery portion of a bottom surface of said upper panel; and
a second color frame layer provided at a portion adjacent to an inner periphery portion of said first color frame and extended overlappedly from said first color frame layer to said bottom surface of said upper panel, wherein said first and second color frame layers are composed to form said ornamental frame and adapted for covering said signal leads disposed at said edges of said touch sensor.

7. The touch panel, as recited in claim 6, wherein said first color frame layer is a printed color frame layer printed with black printing ink and has a coating thickness more than 10 μm.

8. The touch panel, as recited in claim 6, wherein said second color frame layer is a photo-resistance color frame layer utilizing black negative photoresist to form a coating thickness of less than 2 μm.

9. The touch panel, as recited in claim 7, wherein said second color frame layer is a photo-resistance color frame layer utilizing black negative photoresist to form a coating thickness of less than 2 μm.

10. The touch panel, as recited in claim 9, wherein said touch sensor comprises an upper capacitance sensor layer provided with a plurality of X-Traces and a lower capacitance sensor layer provided with a plurality of Y-Traces, wherein said signal leads are provided at peripheral edges of said upper and lower capacitance sensors, wherein end portions of said X-Traces and said Y-Traces are electrically connected to said signal leads respectively.

11. The touch panel, as recited in claim 10, wherein said upper capacitance sensor layer of said touch sensor is provided on a working portion area of said bottom surface of said upper panel with peripheral edge thereof overlapped on said photo-resistance color frame layer, wherein connection points of said signal leads are overlapped with said printed color frame layer and said photo-resistance color frame layer and then connected with said peripheral edge of said upper capacitance sensor layer.

12. The touch panel, as recited in claim 11, wherein said lower capacitance sensor layer of said touch sensor is provided on a working portion area of the top surface of said lower panel, and connection points of said signal leads are connected with said peripheral edge of said lower capacitance sensor layer.

13. The touch panel, as recited in claim 12, wherein said upper panel and said upper capacitance sensor layer thereon are overlapped with said lower panel and said lower capacitance sensor layer thereon with an insulating layer therebetween.

14. The touch panel, as recited in claim 13, wherein said upper panel, said upper capacitance sensor layer, said insulating layer, said lower capacitance sensor layer, and said lower panel are overlappedly stacked and integrated to form an integral panel body, wherein said ornamental frame.

15. The touch panel, as recited in claim 14, wherein said first color frame layer is a film printed onto portions nears said outer periphery portion and portions with holes or grooves of said lower panel.

16. The touch panel, as recited in claim 15, wherein said inner periphery edge of said printed color frame layer is coated with a thinner photo-resistance film color frame layer by means of a photo-resistance coating method.

17. The touch panel, as recited in claim 15, wherein said first color frame layer and said second color frame layer are non-transparent film layers.

18. The touch panel, as recited in claim 15, wherein said first color frame layer and said second color frame layer are nearly non-transparent film layers.

19. The touch panel, as recited in claim 15, wherein said first color frame layer is a printed color frame layer having a film layer thickness of more than 10 μm.

20. The touch panel, as recited in claim 15, wherein said second color frame layer is a photo-resistance color frame layer having a film layer thickness of less than 2 μm.

* * * * *